Patented June 9, 1931

UNITED STATES PATENT OFFICE

WILLIAM B. PINE, OF OKMULGEE, OKLAHOMA, AND JOSEPH B. SHAW, OF STATE COLLEGE, AND MYRIL C. SHAW, OF PITTSBURGH, PENNSYLVANIA, ASSIGNORS OF TWENTY PER CENT TO SAID JOSEPH B. SHAW, TWENTY PER CENT TO SAID MYRIL C. SHAW, AND SIXTY PER CENT TO SAID PINE

VITRIFIED ARGILLACEOUS PRODUCT

No Drawing. Original application filed November 4, 1929, Serial No. 404,863. Divided and this application filed July 16, 1930. Serial No. 468,452.

The present invention relates to vitrified products produced by the direct manufacture from argillaceous materials such as clay and shale, by subjecting the said material to compression and deformation (e. g. molding under pressure) while at a temperature at which a substantial part (say 20 to 35%) of the argillaceous material is actually in a fluid (i. e. fused) state. Thereby the solid portions or particles of the material are forced into the liquid portions thereof, and whereby the latter is forced into the interstices between the solid unfused particles. This fused portion, upon subsequent cooling becomes the binder to hold the article together.

An object of the invention is to produce vitrified argillaceous products which are in some respects superior to any now known vitrified argillaceous products.

A common way, and in fact the ordinary way of producing vitrified clay products heretofore, has been to mix the clay with water sufficiently to form a plastic mass, to then mold the plastic mass in any desired manner either under pressure or not under pressure, then dry the same, and heat up to the vitrification range of temperature. Clay used for ceramic purposes is always a heterogeneous mixture, containing kaolinite or similar hydrous aluminum silicate and materials more readily fusible than kaolinite, and in many cases also materials less readily fusible than kaolinite.

During the heating, the more readily fusible materials of course fuse first, and in the fused state these materials will perhaps react chemically more or less with constituents of the clay, and after the heating operation has been carried to a sufficiently high point the mass is allowed to cool whereupon the fused material solidifies into a glassy or crystalline binder. The expression "vitrification range" used in the art at present, means that range of temperature through which certain portions of the clay mass will fuse, without the entire material becoming fused. In fact in the manufacture of vitrified clay products, which have not become misshapen during the vitrifying operation, the mass never reaches the condition of being a viscous liquid, but does reach the stage of becoming substantially a plastic solid.

For reasons of economy, we preferably employ clays, shales and the like, which contain more or less iron. Most clays and shales of the cheaper classes, will be found to contain at least 3 to 4% of iron, calculated as ferric oxide. Such clays, while unsuitable for use in making porcelain, or white ware (on account of the high iron content) are very suitable for our process. We may add to the raw clay, materials which will lower the vitrification temperature of the mass. Thus we may add dolomite, magnesia or similar materials, up to 25 or even 30%. We may add slag (blast furnace slag etc.) up to 10–15% or other silicates such as feldspar up to 6–10%. These all act as fluxes at temperatures below that necessary for melting clays, even of the cheaper classes. These additions may be pure, but the cheaper impure materials, being suitable, can be used. They can be ground to a fine powder and well mixed with the clay, in a preliminary operation. The amount of feldspar to be added or present should not be sufficient to flux a large percentage of the clay. Clay sometimes contains a little undecomposed feldspar, as a natural constituent.

In the present process the temperature during the high temperature treatment will be substantially the same (or possibly a little higher than) the temperature, for that particular material, constituting the maximum temperature usable in the vitrification process of the prior art, for that particular material.

In accordance with the present invention, the argillaceous material may be preliminarily shaped or not as desired, and if preliminarily shaped this operation can be conducted in a wet or dry or semi-wet condition, as desired. The material is heated, either in a shaped condition or not, up to slightly below the P. C. E. (pyrometric cone equivalent) of that particular material, preferably not more than 100° C. below the P. C. E. value for the particular argillaceous material. The heating may be conducted slowly or rapidly as desired, and the heat can be supplied in any desired manner, by combustion, electric furnace or in any other way. The material is then ready for molding, shaping, compressing into the desired shape and size. When the material has reached the temperature at which it is to be molded, the same will be a mixture of heterogeneous character, containing (a) solids, (b) viscous liquids and (c) liquids of relatively low viscosity. And considered as a mass, it is a plastic solid.

Clay is a heterogeneous mixture of different crystalline and amorphous materials. Under heat, new materials will be formed by chemical reaction. As the temperature progresses, a point is reached where certain of these compounds are converted from the solid to the freely liquid state of fusion. Other of these materials under heat have a range of temperature over which they are highly viscous liquids.

Any change whatsoever from solid to liquid state by heating accompanied by compression while partly molten, results (up to a certain degree) in shrinkage in volume, decrease in porosity and increase in strength. These changes are evidence of vitrification. Complete vitrification is followed at higher temperatures by fusing and swelling produced by gases evolved or entrapped.

At any given temperature a given particle in the mass, composed wholly of a given material will have equal fluidity throughout its mass. Different compounds (which may be crystals or not) will have different viscosities at any given temperature. The viscosity of the whole clay mass at any given temperature, is the resultant viscosity of all the materials present.

In our process, the per cent of unfused solid, at the high temperature stage, is always relatively high (say 65 to 80% of the whole mass), so that the mass will scarcely flow under atmospheric pressure but the per cent of liquid is sufficiently high to admit of pressing the solids into the liquid and to fill substantially all voids between the grains of solids to serve as a cementing medium, holding the grains of solids together and the whole forming a solid substantially impervious mass when cooled. At the time when the material is to be pressed into shape, it should be about on the border line between a very viscous liquid and a plastic solid, so that at such temperature, the material will only deform slightly, if at all, by the force of gravity, even if kept at that temperature for a considerable time, say 24 hours.

At this stage one should clearly distinguish between a liquid mass or fused mass of low viscosity, a highly viscous liquid, a plastic solid and a rigid solid material. The relative proportions of unfused solid matter, highly viscous liquid and liquid of low viscosity should be such that the mass would have to be handled as a solid, and the mass could not be molded or cast by flowing the same as a liquid into a mold.

The mass itself is not a liquid mass containing solids in suspension, but is a plastic solid, namely, it is composed in major part (over 60% and preferably 65 to 75%) of solid particles, mixed with a smaller amount of fluids, at this stage. The mass is then ready for molding.

The molds can be cold but are preferably hot, in order not to extract too much heat from the mass of material during the early stage of the molding operation. If the mass has been heated in bulk, it can be shoveled, raked or dropped at this stage, into a suitable mold, and then pressure applied for molding the material. The pressure may (for example) be applied by suitable rollers which compress the plastic solid material into the mold, and which, throughout the body of the material, push the solid portions into the liquid portions of the mass and cause the liquid portions to flow into the voids, whereby the liquid portions become a binder. Or the pressure could be applied by a rigid plunger. The pressure also will force out gases which may be entrapped in the mass. The compression must be performed at the time when the material contains a substantial amount (preferably over 20 or 25% but preferably not over 30%) of fused constituents, namely when the entire mass is in the condition of a plastic solid.

A plastic solid is a material having such consistency that when pressure is applied to it, no deformation results until the pressure reaches a certain value called the yield point. For pressures above this value the deformation is directly proportional to pressure. A viscous liquid on the other hand does not require the initial pressure to start deformation. Deformation is directly proportional to pressure starting at zero.

I call attention to the feature that suitable metal reinforcements can be provided in the mold before or during the step of filling the mold with the material, whereby a reinforced product will be produced. Any of the ordinary steel or iron reinforcements can be used in this process. These may first be coated with an enamel.

Samples of argillaceous shale were examined in accordance with the usual method of examination of clay and shale to determine their properties and determine their usefulness for making ceramic products. The following are the data secured in these tests.

Sample No. 1

Color: Dark gray.
Plasticity: Good.

| No. | Temp. deg. C. | Porosity | Absorption | Vol. shrink |
|---|---|---|---|---|
| | | Per cent | Per cent | Per cent |
| 1 | 1000 | 34.1 | 20.4 | 1.4 |
| 2 | 1050 | 32.0 | 19.5 | |
| 3 | 1100 | 31.7 | 19.1 | .85 |
| 4 | 1150 | 30.9 | 18.2 | 3.0 |
| 5 | 1200 | 27.6 | 15.7 | 5.5 |
| 6 | 1250 | 25.0 | 13.7 | 9.6 |
| 7 | 1300 | 11.4 | 5.5 | 20.8 |
| 8 | 1350 | 2.7 | 1.2 | 26.9 |

Linear shrinkage: 5.5%.
P. C. E. – Cone 12 – (=1370° C.).

Sample No. 2

Color: Light tan.
Plasticity: Good.

| No. | Temp. deg. C. | Porosity | Absorption | Vol. shrink |
|---|---|---|---|---|
| | | Per cent | Per cent | Per cent |
| 1 | 1000 | 28.6 | 16.4 | |
| 2 | 1050 | 29.4 | 16.8 | |
| 3 | 1100 | 27.7 | 15.2 | 3.9 |
| 4 | 1150 | 25.5 | 13.8 | 5.9 |
| 5 | 1200 | 19.9 | 10.3 | 10.1 |
| 6 | 1250 | 15.6 | 7.7 | 14.1 |
| 7 | 1300 | 3.6 | 1.6 | 20.8 |
| 8 | 1350 | 4.9 | 2.9 | –3.0 |

Linear shrinkage: 7.5%.
P. C. E. – Cone 14 – (=1410° C.).

The data on these shales would be interpreted as representing material capable of producing a good face brick or hollow tile when treated in accordance with present standard practices in manufacturing these products (i. e. treated by the prior art).

We give the following experiments made on samples Nos. 1 and 2 respectively, in accordance with the present invention.

Example 1

The shale referred to in sample 1 above, was first crushed so that 50% of the same would pass through a 28 mesh screen, and the remaining 50% would pass through an 8 mesh screen but would be retained on a 28 mesh screen. This material was then thoroughly mixed together and was very slightly moistened, and was then pressed into a briquet while moist. The material was then placed into a muffle of a furnace and was heated up to about 1270° C., (100 degrees below the P. C. E. value), at which point it was subjected to pressure by a heavy roller, was again heated to 1270° C. and again subjected to pressure by the roll, again reheated to 1270° C. and again subjected to pressure by the roll. In this experiment the material cooled off substantially during each rolling, but the temperature at the time of rolling was close to 1270° C. During this operation the thickness of the briquet was reduced about one-third. The product was then put back into the muffle and the fire turned out to allow the muffle to cool slowly for annealing the material. (The annealing could have been done in an annealing leer.) The resulting product was an extremely hard, rock-like, strong, dense, vitreous material. The material is substantially free from bubbles and is substantially impervious. It is heavier than any product that could be made by previous processes from the same raw material (bulk specific gravity is here referred to). A broken surface of this product shows complete vitrification and shows a stony fracture. This material being made from a mixture of coarse and fine particles, the coarse grains have not lost their identity although in some cases they have been distorted by the pressure.

In this particular example the product was made from a mixture of coarse and fine material in equal volumes. However we call attention to the fact that these proportions can vary substantially or the process can be applied to the treatment of material all of which is fine.

Example 2

The material No. 2 referred to, all crushed to pass a 28 mesh screen was mixed with a little water and made into a rough tile. This was heated to 1350° C. (60 degrees below the P. C. E. value), in the muffle (after drying) and then was pressed between rollers three times as above indicated under Example 1, then annealed. This clay had developed a decidedly vesicular structure during the heating process and had swelled materially. This product was dense but decidedly vitreous in character, gas bubbles had been flattened out to narrow slits by the rolling process. During the rolling operation the thickness was decreased to about one-third of the original thickness. Such a material would be suitable for a beam or post, a railway tie, brick or tile or paving material.

A particular utility of the product of the present invention is for the manufacture of paving bricks, and large paving units or slabs. Thus for instance it is entirely feasible to mold, by the methods hereinabove described, large slabs, say 5 to 10 feet square, reinforced or not as desired, which may be 5 to 10 inches thick. These can be readily manufactured and shipped to the point of use. Also heavy building materials such as beams, terra-cotta, tiles, building blocks, railroad ties, curbstones, sidewalk slabs, large refractory blocks for refractory purposes (as for example glass making tanks, or glass melting tanks) can be made by this process, any or all of which may be reinforced if desired.

It is to be noted that we do not confine the invention to the making of slabs or blocks, but products of any desired shape can be made by this process.

An important feature of the present invention is the possibility of carrying out the process in a continuous manner, largely mechanically, thereby eliminating hand labor to a large extent.

One advantageous mode of carrying out the process is to heat the clay or shale or artificial mixture of or containing these materials, in a rotary kiln, to the temperature at which it is to be compressed, and to then let it drop, from the lower end of such kiln, into a mold (which may be preheated or not) until a sufficient mass of the so heated material is in the mold, and to then compress the same in the mold, by a heavy roller or a plunger, or other similar device, after which the mold carrying the molded article, or the said article alone, is passed into and through a suitable annealing leer.

Another important advantage is the fact that the process very greatly reduces the time necessary for producing a vitrified clay product, resulting in a material lowering of the fuel required.

Reference has been made herein to having the material at temperatures well above the temperature of incipient vitrification of the particular material, prior to compressing the same. This expression "temperature of incipient vitrification" of course refers to temperatures at which the material will commence to vitrify while the material is at atmospheric pressure. When such a material is subjected, at that temperature or slightly below to high pressure (several hundred or even several thousand pounds per square inch) in a mold, for a considerable period of time, vitrification takes place along with the shaping of the material.

The compression, or molding under pressure, in the present invention, is effected within the vitrification range, of the particular material used. Furthermore the element of time during which pressure is applied, is not a factor in bringing about vitrification of the product.

The function of pressure in the present process is simply to shape the article and to compress the already hot material into a dense strong product.

We do not limit ourselves to the use of a single clay or shale but we may blend two or more clays or shales or add other materials than clay. The material at the time of being compressed will be in the consistency of clay during the vitrification process and not the consistency of glass during the blowing or casting process.

We may operate with high pressures at temperatures low in the vitrification range or with lower pressures at temperatures higher in the vitrification range.

The finished product will be a vitrified ceramic product, not a glass. Fracture of the product may be stony or vitreous.

While the rolling process is easily used and probably most desirable, we may use direct pressure at any angle or apply pressure by any suitable means.

We have referred above to metallic reinforcements of steel or iron. Other metallic pieces, such as copper wire or rods, brass, etc., may be introduced as electrical conductors.

The process, as herein described, and which may briefly be defined as applying a shaping and compressing pressure to clay, shale and mixtures of these, with or without other materials (natural or added) while in a pyroplastic state, produces shaped products directly, the products being characterized by having higher density, lower absorption, greater tensile strength, greater crushing strength, and greater modulus of rupture than the vitrified clay products of the prior art. They may have a higher or lower content of glassy material than vitrified clay products made by the old process, depending on the temperature of molding and the particular clay or mixture used. These results are achieved because when a clay product is produced under the old processes, if it is fired to the point where a high percentage of the glass phase is formed, it invariably bloats, resulting in high porosity and it warps out of shape resulting in misshaped articles. By use of this process the pressure results in compressing the article into a smaller space, thereby reducing the porosity and at the same time correcting warpage and resulting in a perfectly shaped article.

Another highly important characteristic in which the new products differ from the old is in that cracks which sometimes develop in burning or drying and which are never healed in the old process, are by this new process completely eliminated and closed up.

Another characteristic wherein this process produces a new type of product is in that many clays contain minerals which disintegrate or liberate gases (usually by chemical action) during the firing process, resulting in a weakening of the structure because of either an expansion or a contraction. Such weaknesses are completely corrected by this new process by compressing the article after the disintegration has taken place resulting in a strong, dense body. These weaknesses are particularly apt to result from the presence of quartz or cyanite and/or carbonates in the clay under treatment.

These characteristic properties resulting from this new process are brought about by the fact that the solid or semiplastic ingredients of the body are forced into the more fluid portions of the body by the pressure and the squeezing out of gas bubbles and the filling of voids, therefore resulting in a more perfect cementing of the whole body together.

Another condition in which this new product differs from anything which can be made by present processes is in the uniform condition of products throughout the thickness of massive bodies. Under present burning processes when articles of great thickness, say 6 or 8 inches thick, are made, the interior of the body oxidizes and vitrifies more slowly than the exterior. This results in the introduction of strains and also in black cores in the middle of the piece. Under the new process massive pieces of any thickness desired can be produced and because of the possibility of blending thin sections together by pressure the ultimate massive body will have the same physical structure throughout its thickness because the heat will have performed this function of vitrifying the body prior to the blending together of the several sections and when they are thus pressed together all joints will disappear and the ultimate product will be uniform in color and density throughout its mass.

The new product differs from old products in that a raw material possessing no plasticity whatever (in the raw state) can be formed into a good product. The plasticity is an essential property in the molding of the prior processes in many cases, whereas in this product the property of plasticity is of no consequence.

Finally, the ultimate shaped body, as to perfection of corners and edges and the straightness of sides when formed under this new process is absolutely perfect in so far as the mold shaping the article can be made perfect, whereas under the old processes the product, being shaped previously to firing, invariably loses some of the perfection of its edges, corners and sides during the firing process because of unequal shrinkage in various parts resulting in products, which, (while passing inspection) are never entirely perfect.

We have referred above to adding various materials to the clay. The mixture, when subjected to the process of heating and molding, should contain at least 70-75% of actual clay, in all cases. We have referred above to adding a small percentage of dolomite, magnesia, chalk or slag, to the clay. Even when adding a small amount of one or several of these, to the clay, the temperature necessary at the time of compression can be substantially lowered. Thus with such a shale as referred to in Example 1, the addition of about 10% of dolomite, will enable the process to be carried out at about 1170° C., instead of 1270° C., as mentioned in said example. This effects a substantial saving in fuel.

Reference is made to the fact that the products produced in accordance with the present process are superior to those produced in the standard method heretofore used. The improvement embraces an increase in the Moh's hardness, increase in bulk specific gravity, increase in apparent specific gravity, decrease in porosity (both as to open and closed pores), decrease in absorption, increase in modulus of rupture, increase in toughness, decrease in slag penetration and better maintenance of true shape. The said "standard method" referred to consists in wet-molding or pressing the blocks, brick, etc., drying same, stacking these in a kiln and slowly heating to within the vitrification range (this temperature depending on the particular clay or argillaceous material employed), said heating requiring a long time, (frequently several days or even several weeks) after which the articles are allowed to slowly cool. Great care must be exercised in such standard method, during the high temperature stage, to prevent overheating, which frequently produces cracks, swelling, warping and similar defects in the product. These defects are produced in many cases by gases liberated by chemical action of the ingredients, one upon another, of the clay or argillaceous material. In our process any gases liberated are largely pressed out of the mass during the compression operation.

We claim:—

1. A shaped compressed vitrified product composed of an argillaceous material selected from the herein described group consisting of natural clays and shales and mixtures thereof in which the percentage of easily fusible constituents is too low to constitute a porcelain, and, such material being compressed into shape while at a temperature between the temperature of incipient vitrification of the said argillaceous material and the P. C. E. value thereof.

2. A shaped compressed vitrified product composed of an argillaceous material which lacks sufficient feldspar and quartz in its composition to form a porcelain, compressed into shape while at a temperature between the temperature of incipient vitrification of the said argillaceous material and the P. C. E. value thereof.

3. A shaped compressed vitrified product composed of an argillaceous material selected from the herein described group consisting of natural clays and shales and mixtures thereof in which the percentage of easily fusible constituents is too low to constitute a porcelain, and, such material being compressed into shape while at a temperature between the temperature of incipient vitrification of the said argillaceous material and the P. C. E. value thereof, and containing a metallic reinforcing member embedded in the mass.

4. A shaped compressed vitrified product composed of an argillaceous material which lacks sufficient feldspar and quartz in its composition to form a porcelain, compressed into shape while at a temperature between the temperature of incipient vitrification of the said argillaceous material and the P. C. E. value thereof, and containing a metallic inset embedded in the mass.

5. A vitrified clay product in which the percentage of easily fusible constituents is too low to constitute a porcelain, and having a Moh's hardness higher than that of any heretofore known vitrified brick made from the same clay.

6. A vitrified argillaceous product in which the percentage of easily fusible constituents is too low to constitute a porcelain, and having about 10 to 30 per cent of binding material which has been fused and a percentage of pores less than the percentage of pores in any vitrified argillaceous product which could be produced from the same argillaceous material by wet molding and vitrifying by the standard method heretofore employed.

7. A structural material consisting of a metallic structural material imbedded in a molded vitrified argillaceous product, in which the percentage of easily fusible constituents is too low to constitute a porcelain.

8. A vitrified argillaceous product in which the percentage of easily fusible constituents is too low to constitute a porcelain, and containing an elongated metallic element imbedded therein.

9. A molded vitrified argillaceous product, too poor in feldspar and quartz to constitute a porcelain, and being harder, stronger in tensile and compressive strength, tougher, more resistant to abrasion, denser, having a smaller percentage of pores, having a higher bulk specific gravity, than could be produced in any product made from the same raw argillaceous material by wet molding, drying and vitrifying while unconfined.

In testimony whereof we affix our signatures.

WILLIAM B. PINE.
JOSEPH B. SHAW.
MYRIL C. SHAW.